United States Patent
Satoyama et al.

(10) Patent No.: US 7,461,225 B2
(45) Date of Patent: Dec. 2, 2008

(54) STORAGE SYSTEM AND REPLICATION CREATION METHOD THEREOF

(75) Inventors: Ai Satoyama, Sagamihara (JP); Yasutomo Yamamoto, Sagamihara (JP); Noboru Morishita, Yokohama (JP); Yoshiaki Eguchi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/727,945

(22) Filed: Mar. 29, 2007

(65) Prior Publication Data

US 2007/0180191 A1 Aug. 2, 2007

Related U.S. Application Data

(63) Continuation of application No. 10/766,823, filed on Jan. 30, 2004, now Pat. No. 7,219,202.

(30) Foreign Application Priority Data

Dec. 3, 2003 (JP) .............................. 2003-403868

(51) Int. Cl.
*G06F 12/16* (2006.01)
(52) U.S. Cl. ........................... 711/162; 711/161; 714/5; 714/6
(58) Field of Classification Search ................. 711/162, 711/161; 714/5, 6
See application file for complete search history.

(56) References Cited

U.S. PATENT DOCUMENTS

| | | | |
|---|---|---|---|
| 4,785,415 A | 11/1988 | Karlquist | |
| 5,210,866 A | 5/1993 | Milligan et al. | |
| 5,403,639 A | 4/1995 | Belsan et al. | |
| 5,459,857 A | 10/1995 | Ludlam et al. | |
| 6,073,209 A | 6/2000 | Bergsten | |
| 6,131,148 A | 10/2000 | West et al. | |
| 6,341,341 B1 | 1/2002 | Grummon et al. | |
| 6,567,774 B1 | 5/2003 | Lee et al. | |
| 6,606,690 B2 | 8/2003 | Padovano | |
| 6,820,180 B2 | 11/2004 | McBrearty et al. | |
| 6,883,073 B2 | 4/2005 | Arakawa et al. | |
| 2002/0013864 A1 | 1/2002 | Dandrea et al. | |
| 2002/0124139 A1* | 9/2002 | Baek et al. | .................. 711/114 |
| 2002/0129214 A1 | 9/2002 | Sarkar | |
| 2003/0051111 A1 | 3/2003 | Nakano et al. | |
| 2003/0131207 A1 | 7/2003 | Arakawa et al. | |

(Continued)

FOREIGN PATENT DOCUMENTS

EP 656 588 6/1995

(Continued)

*Primary Examiner*—Sanjiv Shah
*Assistant Examiner*—Jae U Yu
(74) *Attorney, Agent, or Firm*—Mattingly, Stanger, Malur & Brundidge, P.C.

(57) ABSTRACT

In a storage system having a plurality of control units each connected with a plurality of disk units, it is provided that a replication is created in the volume of the disk units connected to different control units. The replication creation unit of a given control unit creates a replication in the volume of the disk unit connected to other control units in such a manner that the original volume information, the replication volume information in the control unit and information on the other control units are registered as volume pair information. Based on this volume pair information, a replication creation request is transmitted to the other control units.

2 Claims, 14 Drawing Sheets

U.S. PATENT DOCUMENTS

2003/0204572 A1 10/2003 Mannen et al.
2004/0085317 A1 5/2004 Malik et al.

FOREIGN PATENT DOCUMENTS

| EP | 1217523 | 6/2002 |
| JP | 7-210439 | 8/1995 |
| JP | 2001-318833 | 11/2001 |
| JP | 2003-131818 | 5/2003 |

* cited by examiner

| PAIR NO. | MAIN VOLUME NO. | SECONDARY VOLUME INFORMATION | | | PAIR STATUS |
|---|---|---|---|---|---|
| | | VIRTUALIZE VOLUME NO. | REAL DATA STORAGE STORAGE CONTROL UNIT NO. | REAL DATA STORAGE VOLUME NO. | |
| 0 | 100 | 200 | | | Pair |
| 1 | 110 | 210 | 2 | 120 | Pair |
| 2 | 120 | 220 | | | Split |
| 3 | 130 | 230 | 3 | 260 | Pair |
| 4 | 140 | 240 | | | Split |

221  222  223  224  225  226

220

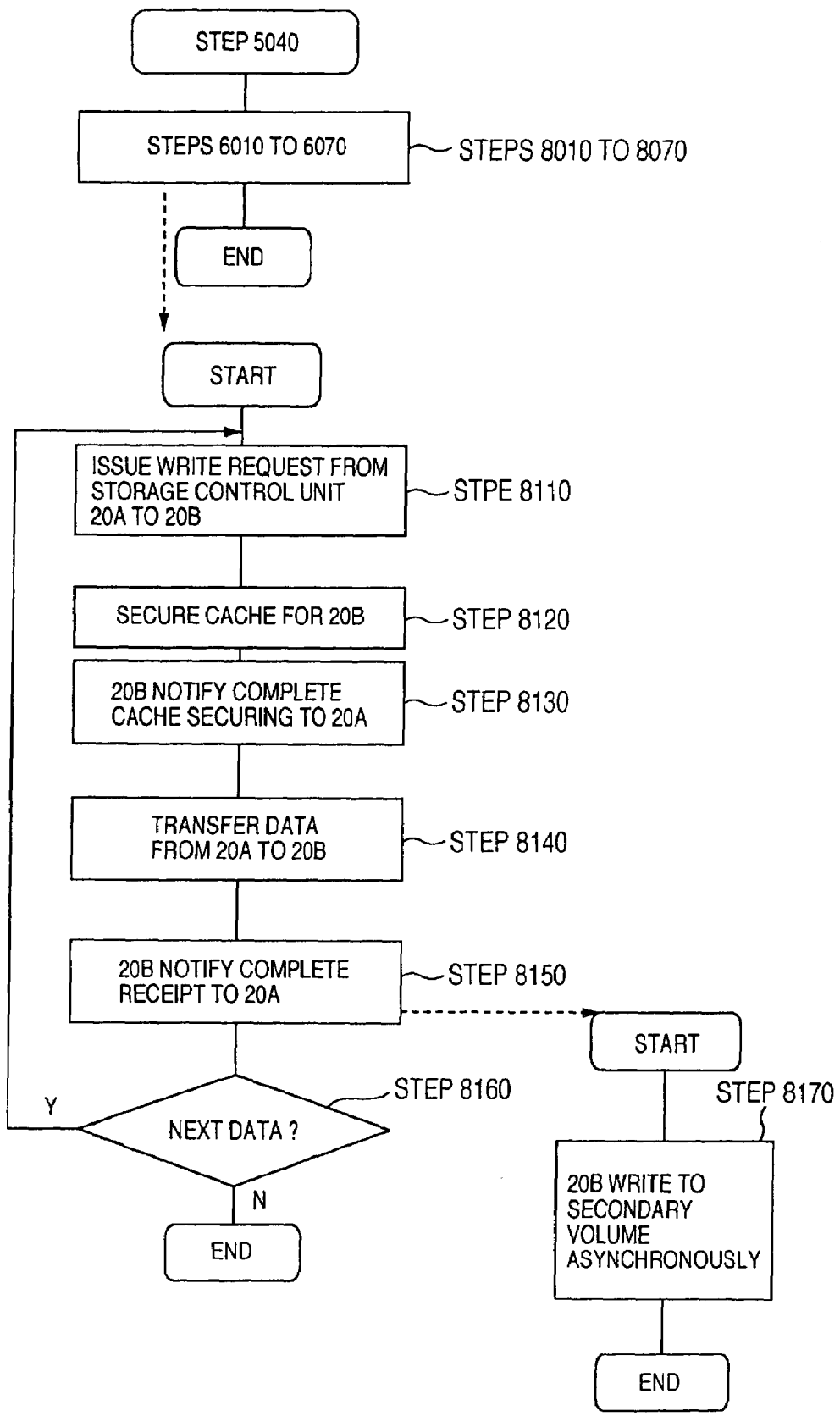

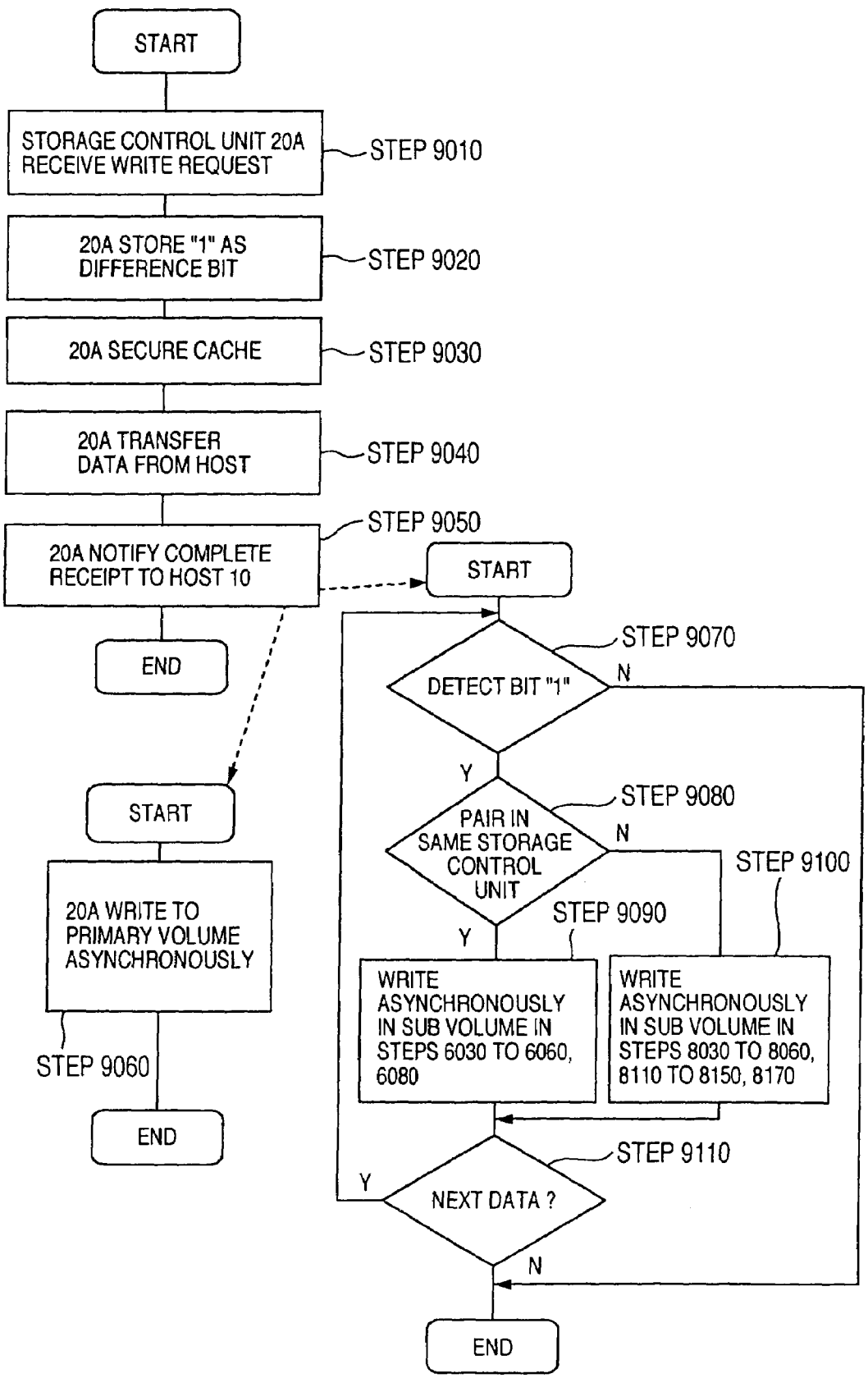

| VOLUME NO. | PRIMARY/ SECONDARY | MATING VOLUME INFORMATION | | | VOLUME OCCUPIED |
|---|---|---|---|---|---|
| | | SUB VOLUME OR VIRTUALIZE | REAL VOLUME INFORMATION | | |
| | | | STORAGE CONTROL UNIT NO. | VOLUME NO. | |
| 0 | PRIMARY | 1024 | 1 | 20 | OCCUPIED |
| 0 | PRIMARY | 158 | — | — | OCCUPIED |
| 0 | PRIMARY | 1025 | 1 | 426 | OCCUPIED |
| 1 | SECONDARY | | 3 | 3783 | OCCUPIED |

230

231 232 233 234 235 236

JOB PRIORITY INFORMATION BIT MAP

STORAGE SYSTEM AND REPLICATION CREATION METHOD THEREOF

This application is a continuation of U.S. patent application Ser. No. 10/766,823, filed Jan. 30, 2004, now U.S. Pat. No. 7,219,202, which is incorporated by reference herein in its entirety.

BACKGROUND OF THE INVENTION

The present invention relates to a storage system comprising a plurality of control units each connected with a plurality of disk units.

In recent years, demand has risen to shorten the time required for the process (hereinafter referred to as the backup process) to replicate the data stored in a given storage unit to another storage unit held by a business organization. On the background of this demand is the increase in the information amount held by each organization, and the time consumed for backup is ever on the increase, while the increase in the business hours of each organization has decreased the relative length of time that can be assigned to the backup process.

A "snapshot" has been proposed in JP-A-7-210439 and JP-A-2001-318833 as a technique for backing up the data stored in a storage device without suspending the routine work of organizations. The snapshot is defined as a function of producing a copy of a storage area of a storage device at a specific time point without the intermediary of the computer connected with the storage device. Taking advantage of the function, the user uses the original storage area for business, and the data stored in the copy storage area for backup.

SUMMARY OF THE INVENTION

A cluster configuration storage system is conceived as a technique for increasing the salability of a storage device connected to the network. The cluster configuration storage system is so configured that each storage system includes a plurality of clusters each constituting a conventional storage system such as a disk array unit.

No past reference is available which indicates a snapshot in the conventional cluster configuration storage system. In the case where the cluster configuration storage system and the conventional snapshot technique are simply combined with each other, the storage area can be copied only in one cluster.

Unless a storage area can be copied between different clusters, however, a single cluster configuration storage system undesirably comes to have both a storage area where data can be copied and a storage area where data cannot be copied, thereby adversely affecting the scalability originally intended for by the cluster configuration storage system.

In the case where a copy of a logical volume (hereinafter referred to simply as the volume) is produced between clusters of the cluster configuration storage system, i.e. in the case where an original volume and a copy volume are existent in different clusters, the cluster associated with the original volume (hereinafter sometimes referred to as the primary volume) cannot access a common memory in the cluster associated with the copy volume (hereinafter sometimes referred to as the secondary cluster), and therefore cannot recognize the load on the secondary cluster. The user thus has no choice but to select a copy volume in the same cluster as the original cluster, and therefore the user operability is inconveniently changed due to a different system configuration from the prior art.

Accordingly, an object of this invention is to provide a storage system comprising a plurality of control units each connected with a plurality of disk units, wherein a copy of a storage area can be produced without being conscious of the difference of a control unit even in the case where a replication of a volume is created in the disk units connected to different control units as well as in the disk units connected to the same control unit.

According to this invention, there is provided a storage system comprising a plurality of control units each having a plurality of disk units, wherein each of the control units includes a replication creation unit for creating a replication of the volume data in the disk units connected to the control unit, and pair information having the information on the original volume and the information on the replication volume, wherein the replication creation unit of a first one of a plurality of the control units, when creating a replication in a volume in a disk unit connected to the same control unit, registers the information on the original volume and the information on the replication volume as the pair information and thus creates a replication in the volume in the disk unit connected to the same control unit based on the pair information, while when creating a replication in a volume in a disk unit connected to a second control unit, the replication creation unit registers the information on the original volume, the information on the replication volume of the first control unit and the information on the second control unit as the pair information, and wherein a request to create a replication is transmitted to the second control unit based on the pair information thereby to create a replication.

In the storage system comprising a plurality of control units each connected with a plurality of disk units, therefore, a copy of a storage area can be produced without being conscious of the difference of a control unit in the case where a replication is created in the volumes in the disk units connected to different control units as well as in the volumes in the disk units connected to the same control unit.

Other objects, features and advantages of the invention will become apparent from the following description of the embodiments of the invention taken in conjunction with the accompanying drawings.

BRIEF DESCRIPTION OF THE DRAWINGS

FIG. 8 a flowchart showing a method of creating a replication in a different storage control unit.

FIG. 9 is an example of a flowchart showing the process executed in the case where a write request is issued during the initial copy operation.

DESCRIPTION OF THE EMBODIMENTS

Figure 1:
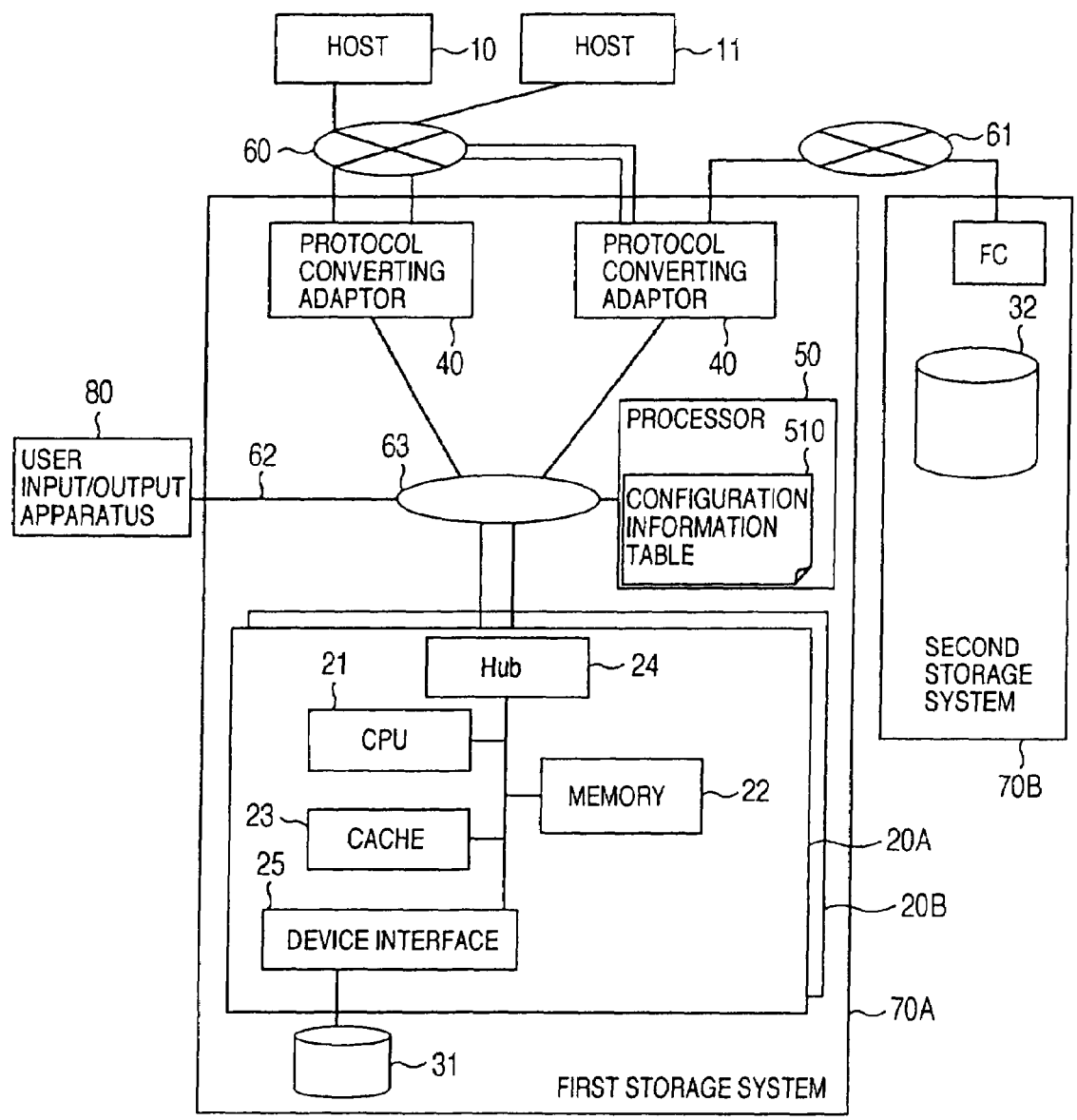
FIG. 1 is a diagram showing a configuration of a computer system according to an embodiment of the invention.

FIG. 1 shows an example of a computer system including a cluster configuration storage system according to an embodiment of the invention.

A first storage system 70A is connected to hosts 10, 11 through a network 60. A user input/output apparatus 80 is connected to the first storage system 70A through a management network 62, and a second storage system 70B to the first storage system 70A through a network 61. The shown case represents a configuration connected with the second storage system 70B. Nevertheless, the second storage system 70B may not be connected.

The storage system 70A has a protocol converting adaptor 40. The protocol converting adaptor 40 is a channel connecting portion independent of a storage control unit 20, and handles a protocol based on LAN (local area network), public network, dedicated line or ESCON (enterprise systems connection). A plurality of the protocol converting adaptors 40 and a plurality of the storage control units 20 are connected to each other through a network 63.

The protocol converting adaptor 40, upon receipt of an input/output command from the hosts 10, 11, analyzes the command and converts the protocol thereof. Then, determining a particular storage control unit 20 controlling the LU (logical unit) storing the data requested by the command on the one hand and whether the LU is managed by the storage system 70B on the other, the adaptor 40 sends the command to the storage control unit 20 thus determined. Which of the storage control units 20 manages the LU is determined by accessing the configuration information table 510 stored on the memory in the processor 50 connected by a network 63.

The user input/output apparatus 80 recognizes the first storage system 70A through the network 63. As an alternative, the user input/output apparatus 80 is connected directly with the first storage system 70A by a dedicated line.

The storage control unit 20 includes a CPU 21, a memory 22, a cache memory 23 for temporarily storing the input/output data from the hosts 10, 11, a hub 24 constituting a connecting portion with the network 63, and a storage I/F 25 for controlling the transmission and receipt of the data to and from the storage units 31. These component parts are connected with each other through an internal bus.

Figure 2:
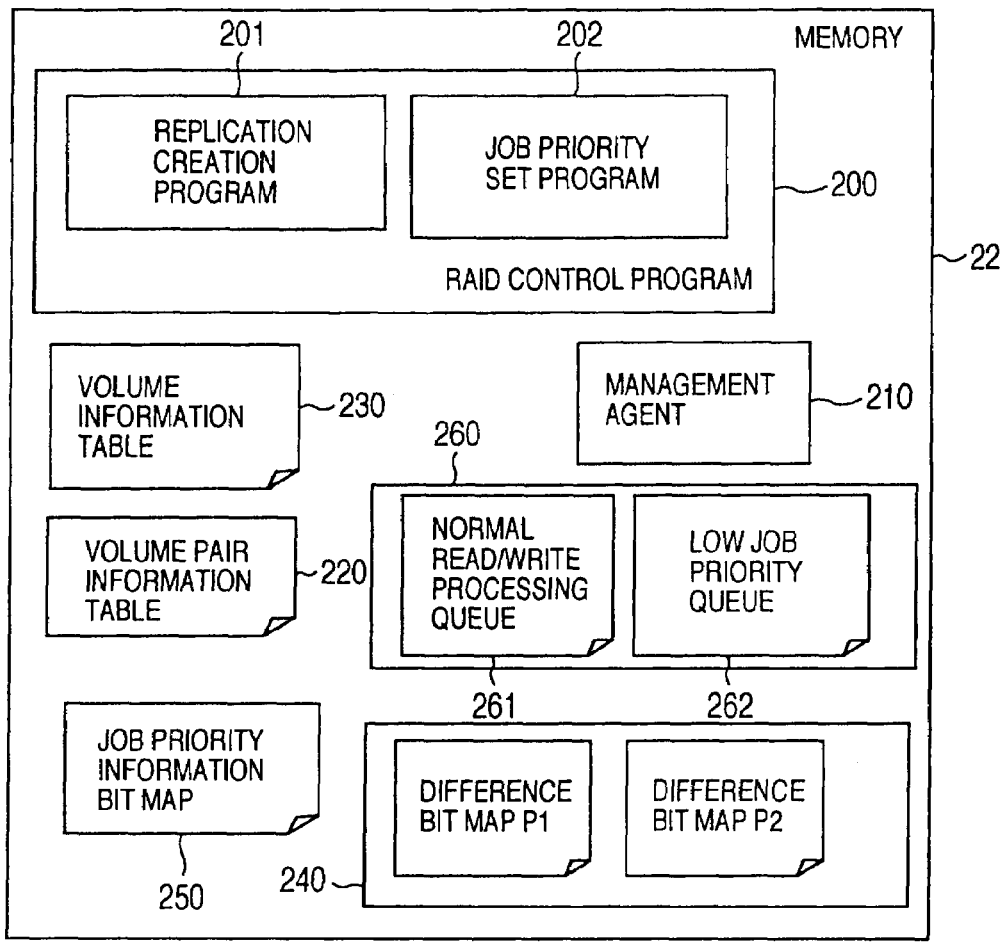
FIG. 2 is a diagram showing a configuration of a memory according to an embodiment of the invention.

FIG. 2 is a diagram showing a configuration of the memory 22 according to an embodiment of the invention. As shown in FIG. 2, various programs executed by the CPU 21 are stored in the memory 22. Specifically, the programs include a RAID (redundant array of inexpensive disks) control program 200 for controlling the operation of the storage system 70, and a management agent 210 for managing the configuration of the storage system 70. The memory 22 also has stored therein various management information. Specifically, the management information includes a volume pair information table 220 for recording the information on the original volume (replication source) and the copy volume (replication volume), a volume information table 230, a job priority information bit map 250, a difference bit map 240, a job queue 260 and a configuration information table (not shown) whereby the storage system 70B provides the storage system 70A with its own LU as a LU of the storage system 70A. The component parts 220 to 250 and the configuration information table may be included in the processor 50.

The RAID control program 200 has a portion (not shown) from which a command is issued to the storage units 31. The RAID control program 200 has therein subprograms including a replication creation program 201 for creating a replication (copy) of the data in the storage system 70 and a job priority set program 201. The RAID control program 200, the replication creation program 201 and the job priority set program 202 are executed by the CPU 21 (FIG. 1) thereby to constitute a RAID control unit, a replication creating unit and a job priority set unit of the storage control unit 20. The RAID control program 200, the replication creation program 201 and the job priority set program 202 may partly or wholly be configured of hardware. The data is replicated either synchronously (a host notified of the completion of the data copy after the completion) or asynchronously (a host notified of the completion of the data copy before the completion). According to this embodiment, however, no distinction is made between the two variations.

The management agent 210 is a program for receiving an input from the user input/output apparatus 80 and setting or outputting the information to the user input/output apparatus 80.

Figure 3:
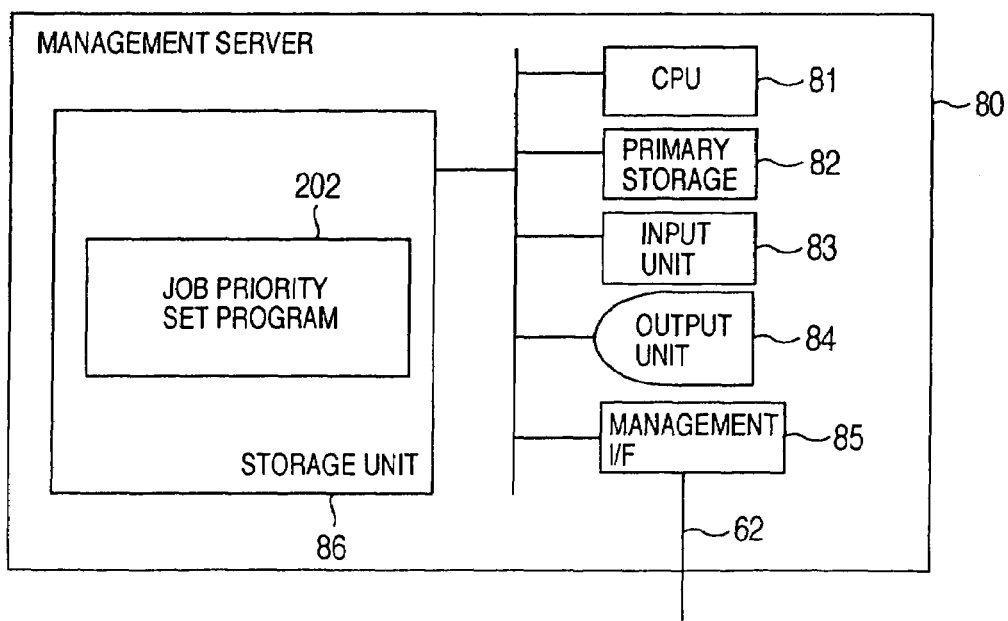
FIG. 3 is a diagram showing a configuration of a user input/output apparatus (a management server, for example) according to an embodiment of the invention.

FIG. 3 is a diagram showing a configuration of the user input/output apparatus 80 according to an embodiment of the invention. The user input/output apparatus 80 includes a CPU 81, a primary storage unit 82, an input unit (keyboard unit, etc.) 83, an output unit (display unit, etc.) 84, a management I/F 85 for connecting to the network 62 and a storage unit 86. These component parts are interconnected by an internal bus. The storage unit 86 has stored therein a job priority set program 202 executed by the CPU 81.

The host 10 is a personal computer, a work station or a general-purpose computer, and has a HBA (host bus adaptor) (not shown) constituting a FC interface for external connection. HBA is also assigned WWN (world wide name).

Figures 4, 5:
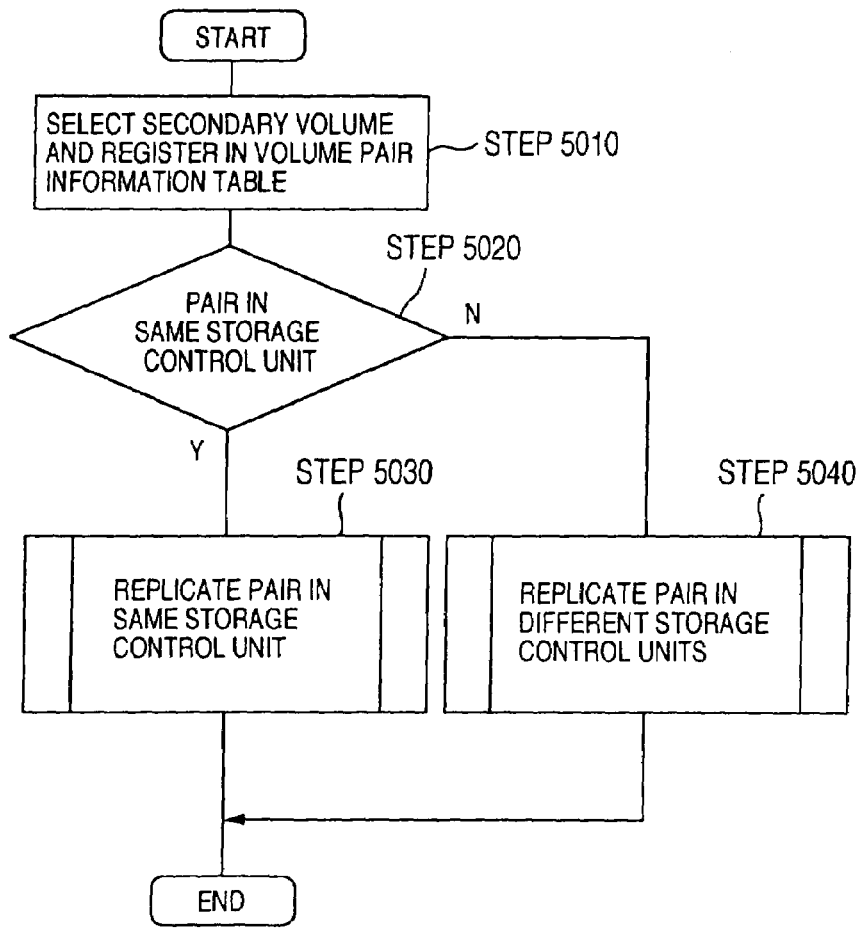
FIG. 4 is a diagram showing an example of a volume pair information table.
FIG. 5 is an example of a flowchart showing an outline of the process for creating a replication.

FIG. 4 is a diagram showing an example of the volume pair information table 220. This table contains information for managing the volume pairs (hereinafter sometimes referred to simply as the pairs) holding the replicated data in the storage system 70, and includes a pair number 221, primary volume information 222, secondary volume information 223 to 225 and a pair status 226. Especially, the information on a pair located in the same storage control units 20A and the information on a pair having an original volume in the storage control unit 20A are stored in the memory 22 of the storage control unit 20A.

The pair number 221 indicates an identifier arbitrarily assigned to each pair.

The primary volume information 222 is the volume number assigned to the primary volume constituting an original volume (original) of each pair assigned an identifier.

The secondary volume information 223 to 225 are the information on the secondary volume constituting the replication (copy) volume of each pair assigned an identifier. The secondary volume number of a pair in the same storage control unit is registered in column 223. As for a pair between different storage control units, on the other hand, a volume number virtualized in the same storage control unit is registered in column 223. The information on the storage control unit of the secondary volume for actually storing the data, such as the storage control unit number, is registered in column 224, and the volume number in column 225. The volume number virtualized in the same storage control unit, though a volume number in the particular storage control unit, is a virtual volume number with which no volume is created for the disk unit connected to the particular storage control unit.

The pair status 226 indicates the current state of a pair. The pair status includes a state (hereinafter referred to as a "paired state") in which the data stored in the volumes of a pair are synchronized and coincident with each other, and a state (hereinafter referred to as a "split state") in which the data of a pair are not synchronized with each other.

In the storage system 70A, a pair in paired state is changed to a pair in split state at an arbitrary time. At the same time, the data which the primary volume of the pair has at an arbitrary time is held in the secondary volume (this process is called "to take a snapshot"). After that, the host 10 reads the data from the secondary volume and writes it in another storage unit (such as a tape unit). Thus, the data stored in the pair at the time when the snapshot is taken can be backed up. As an alternative, the secondary volume after the snapshot is taken may be held as a backup data.

Figures 10, 11:
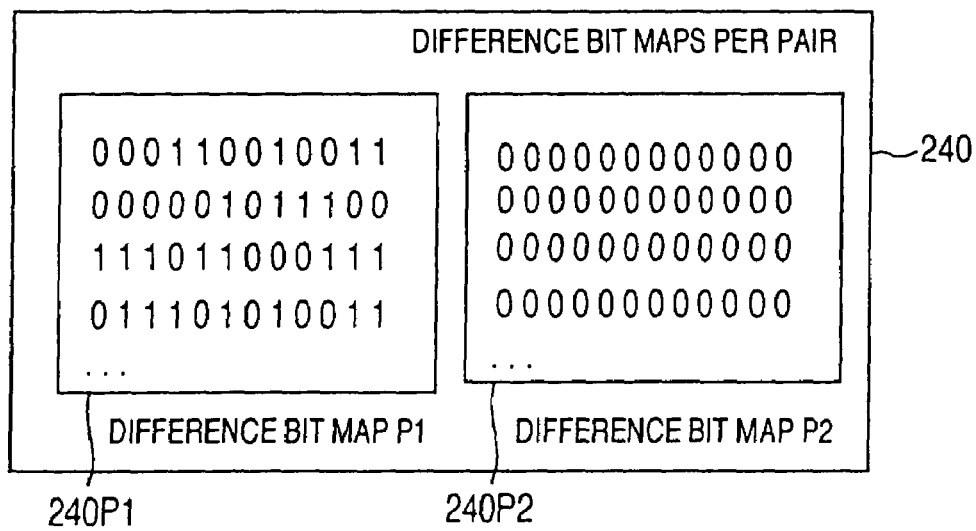
FIG. 10 is a diagram showing an example of a volume information table.
FIG. 11 is a diagram showing an example of a difference bit map.

FIG. 10 is a diagram showing an example of the volume information table 230. This table is for registering the information to manage the volumes controlled by the storage control unit 20A and storing the information in the memory of the storage control unit 20A.

The volume number 231 is an identifier assigned to each volume. The three volume numbers 0 represents a case in which three pairs are set for the same volume number 0. Generally, one or a plurality of pairs can be set for each volume.

The column "primary/secondary" 232 indicates whether a given volume functions as a primary one or a secondary one of a pair.

The mating volume information 233 to 235 are the volume information on the other party of a pair. In the case of a pair in the same storage control unit, the secondary volume number is registered in column 233. For a pair between different storage control units, on the other hand, a volume number virtualized in the same storage control unit is registered in column 233, the storage control unit number of the secondary volume having actually stored the data therein is registered in column 234, and the volume number in column 235. The volume-occupied column 236 is the information indicating whether a particular volume is occupied or vacant.

Assume that FIG. 10 shows the volume information of the storage control unit No. 0. The volume 0 produces three pairs. The first pair indicates that the volume 1024 of the storage control unit No. 0 is a virtualized secondary volume and the secondary volume having an actual data stored therein is volume 20 of the storage control unit No. 1. The second pair indicates the volume 158 in the same storage control unit. The volume 1 is used as a secondary volume of the pair, and the primary volume is the volume 3783 of the storage control unit No. 3.

FIG. 11 is a diagram showing an example of the difference bit map 240. Two bit maps of the same size are prepared for one pair. In the difference bit map, "0" indicates the point where replication is finished, and "1" where the replication is yet to be finished. The data of a predetermined size is rendered to correspond to one bit. In the case where the data of 64 KB to correspond to one bit and even 1B of 64 KB is updated, for example, the bit is set to "1" to reflect the contents in the replication volume.

Figure 14:
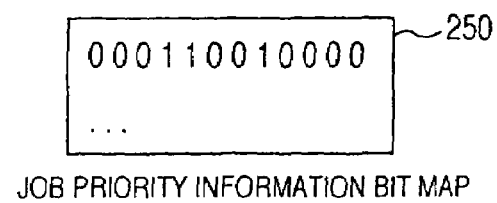
FIG. 14 is a diagram showing an example of a job priority information bit map.

FIG. 14 is a diagram showing an example of the job priority information bit map 250. This bit map indicates the information on that volume controlled by a given storage control unit having the bit map stored therein which constitutes a replication pair with a volume controlled by another storage control unit. The bit "1" indicates the desirability of the processing lower in priority than the normal read/write process. The bit "0" indicates the desirability of the processing with a schedule equivalent to that of the normal read/write processing. Assume that the bit map of FIG. 14 corresponds to the order of volume number. The leading bit represents the information of volume 0. In this bit map, the fourth, fifth and eighth bits are "1". This indicates that the volume 3, 4 and 7 are processed normally when the read/write request is issued a lesser number of times without affecting the normal read/write processing ability. This bit map is indicated by "0" and "1". In the case where the scheduling is desired in several stages of priority, however, the number of bits per volume may be increased.

With this system configuration, an explanation is given about a method of copying a volume of the storage control unit 20A to the storage control unit 20B.

The process of producing a copy volume is executed according to the replication creation program 201. The replication creation program 201 checks to see whether the primary and secondary volumes of a replication pair belong to the same storage control unit or to different storage control units. In the case where the primary and secondary volumes are associated with different storage control units, the process of this invention is executed. In the case where the primary and secondary volumes are associated with the same storage control unit, on the other hand, the conventional process is executed.

FIG. 5 is a flowchart showing an outline of the process for creating a replication in the cluster configuration storage system of FIG. 1. First, a secondary volume providing a replication volume is selected from vacant volumes, and a pair of primary and secondary volumes is registered in the volume pair information table 220 (step 5010). It is determined whether the pair is associated with the same storage control unit 20 (step 5020), and in the case where the pair is associated with the same storage control unit 20, the process of producing a replication in the same storage control unit is executed (step 5030) thereby to terminate the process. In the case where the volumes of the pair are located in different storage control units, on the other hand, the replication creation process between different storage control units is executed (step 5040) thereby to terminate the process.

Figure 6:
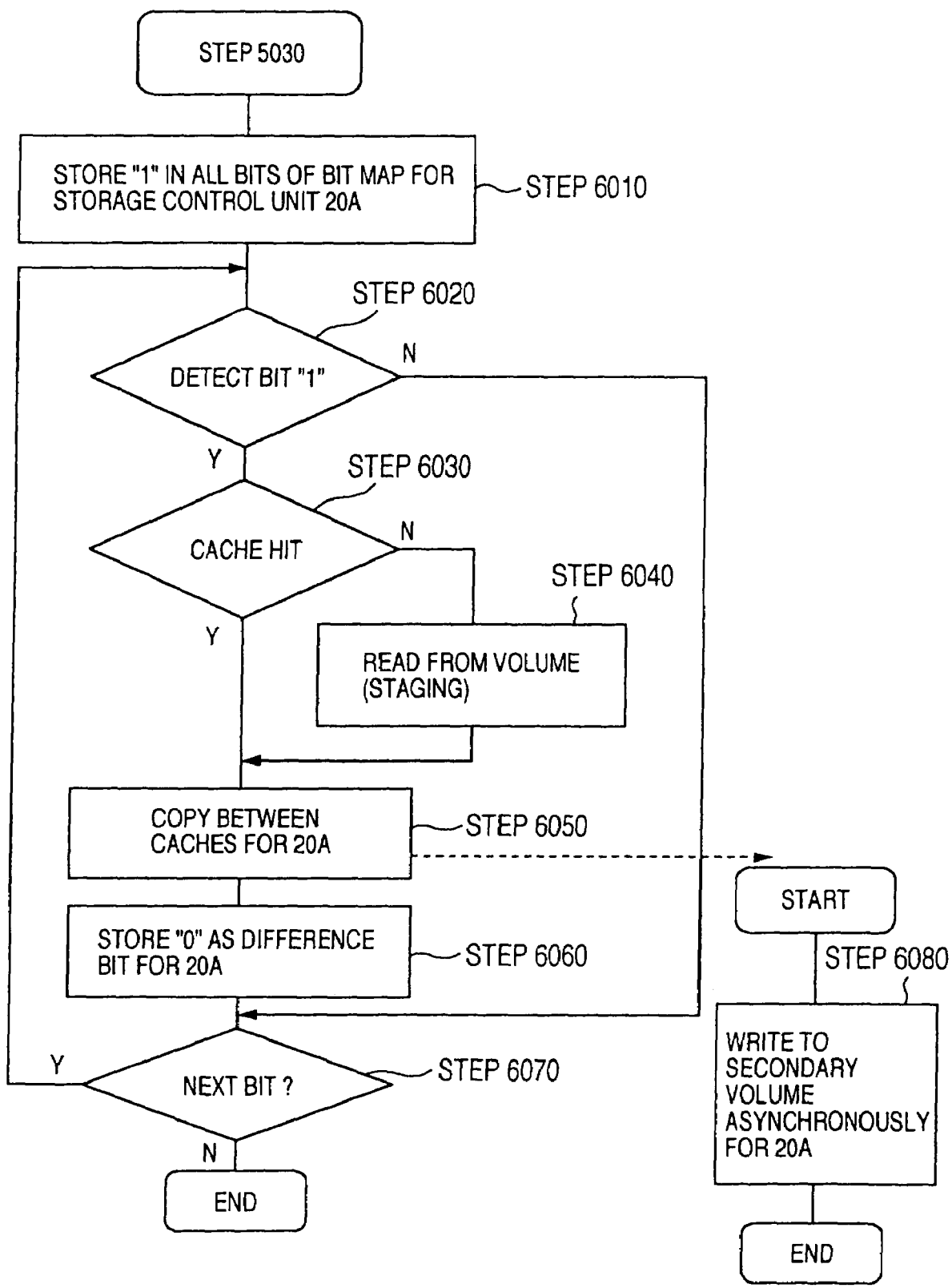
FIG. 6 is an example of a flowchart showing a replication creating method in the same storage control unit.

Next, the process of creating a replication in the same storage control unit in step 5030 is explained with reference to the flowchart of FIG. 6.

The initial copying process is started to copy all the contents of the primary volume to the secondary volume. In the initial copying process, all the bits of the difference bit map 240 P1 shown in FIGS. 2 and 11 are set to "1" (step 6010). Upon sequential detection of bits "1" on the difference bit map (step 6020), it is determined whether the data at a position corresponding to a particular bit "1" is stored in the cache memory or not (step 6030). Upon detection of no bit "1" in step 6020, on the other hand, the process proceeds to step 6070. In the case where the corresponding data is not stored in the cache memory in step 6030, the data is read from the primary volume into the cache memory (step 6040). A copy of the primary volume is produced as a secondary volume data in the cache memory (step 6050). At the same time as the copy operation, the redundant information to determine whether the data are correct or not is newly produced for the secondary volume and attached to the data. Once the data are stored in the cache memory, the difference bit is set to "0" (step 6060). In the presence of the next bit, the process of steps 6020 to 6060 is repeated (step 6070). In the absence of the next bit, on the other hand, the process is terminated. In an alternative method of reading the data from the primary volume, the redundant information for the secondary volume is produced and stored directly in the cache memory as secondary volume data. On the other hand, the secondary volume data on the cache memory are stored in the secondary volume (step 6080).

Next, the process of step 5040 for creating a replication between different storage control units is explained with reference to FIGS. 7 and 8.

Figure 7:
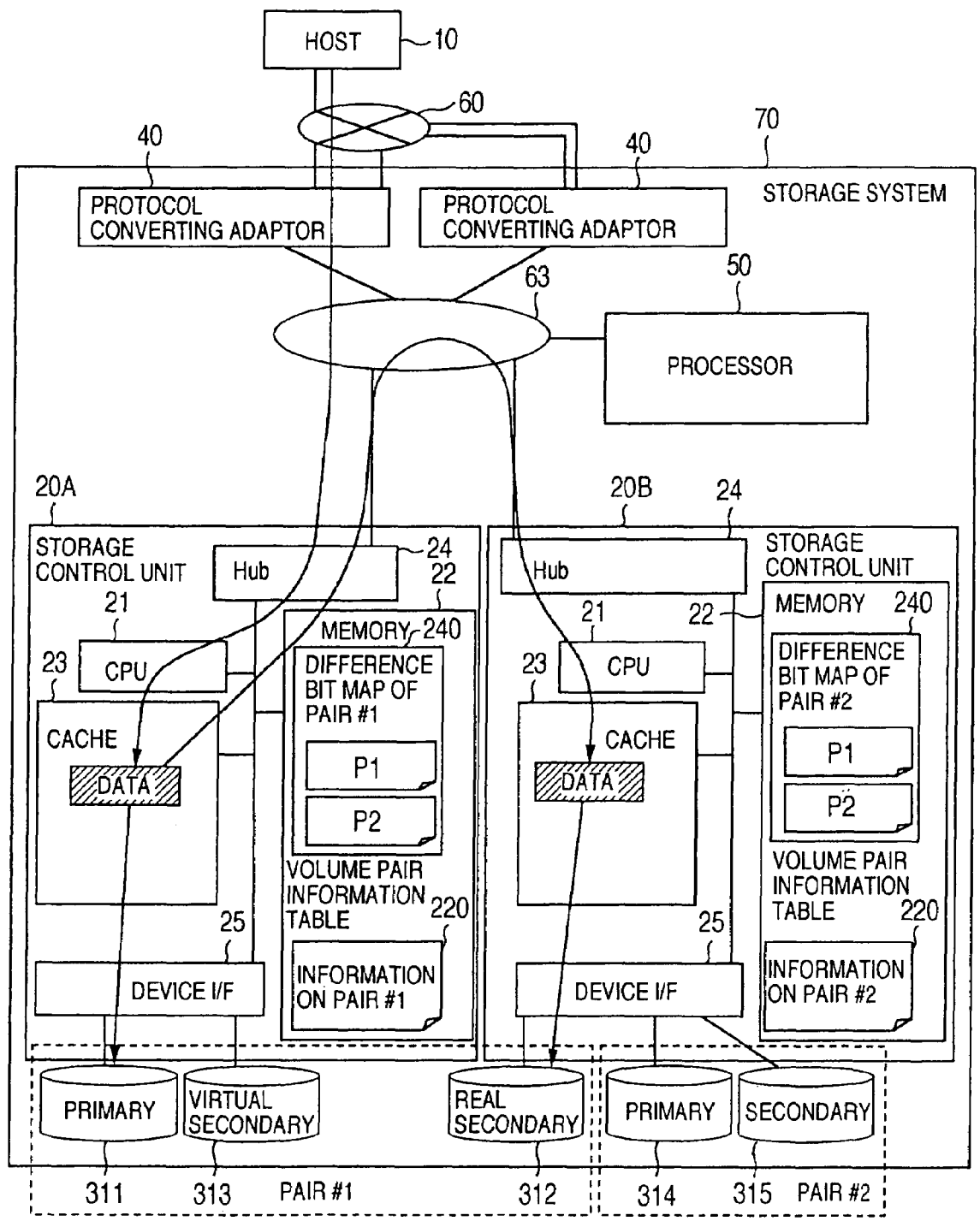
FIG. 7 is a diagram showing the process of a replication creating method in different storage control units according to an embodiment of the invention.

FIG. 7 shows an embodiment in which a replication is created between different storage control units. According to this embodiment, the data is desirably copied to the volume 312 from the volume 311 as an original volume. In the storage control unit 20A having the primary volume 311, the secondary volume 312 in the storage control unit 20B is virtualized into a volume 313 of the storage control unit 20A. As a result, the host executes the replication creation process on the assumption that the volumes of the pair (including the volumes 311 and 313 as pair No. 1) are located in the same storage control unit 20A. On the other hand, the storage control unit 20A, which recognizes that the secondary volume is actually located in the storage control unit 20B, issues a write request to transmit the copy data to the storage control unit 20B. The pair information of pair No. 1 (pair #1) is registered in the pair information table 220 in the storage control unit 20A having the primary volume. The pair information of pair No. 2 (pair #2), on the other hand, which is located in the storage control unit 20B, is registered in the pair information table 220 in the storage control unit 20B.

A replication, if any is created, is desirably created in the same storage control unit and actually created in the same storage control unit as far as possible. In the case where original volumes are concentrated and no vacant area is available in a given storage control unit, however, a replication may be created between a plurality of storage control units. An embodiment in which a replication is created between different storage control units is shown in FIG. 7. In this embodiment, a replication of the primary volume 311 is produced in a real secondary volume 312. Also in this case, a replication volume is selected in such a manner as to produce a replication of the primary volume 311 in a virtual secondary volume 313. In this way, the replication appears to be created within the same storage control unit. The virtual secondary volume 313 uses no data area in the disk unit, but only the volume number. This is the process for virtual data assignment. The host computer recognizes that the primary volume 311 is replicated as a virtual secondary volume 313, and therefore can execute the process, as in the prior art, without recognizing the storage control unit of the replication volume. The host computer issues a request to the storage control unit having the primary volume 311 and the virtual secondary volume 313. On the other hand, the storage system 70 recognizes that the virtual secondary volume 313 is virtually assigned and that the actual volume is a real secondary volume 312. Once a request arrives at the real secondary volume 312, therefore, it is received by the storage control unit of the virtual secondary volume 313 and the contents of the request are transmitted to a storage control unit having the real secondary volume 312.

FIG. 8 is an example of a flowchart showing the replication creation processing method between different storage control units. The replication creation processing method between different storage control units in step 5040 is explained below with reference to the flowchart of FIG. 8.

Steps 8010 to 8070 are identical to steps 6010 to 6070. Though not shown in detail in FIG. 8, the process of the following steps is executed: In step 8010 (corresponding to step 6010), all the bits of the difference bit map 240 P1 shown in FIGS. 2 and 11 are set to "1". In step 8020 (corresponding to step 6020), upon detection of bits "1" on the difference bit map, step 8030 (corresponding to step 6030) determines whether the data at a position corresponding to a particular bit "1", is contained in the cache memory or not. Unless bit "1" is detected in step 8020, the process proceeds to step 8070 (corresponding to step 6070). In the case where the data at a position corresponding to bit "1" is not found in the cache memory in step 8030, step 8040 (corresponding to step 6040) reads the data from the primary volume into the cache memory. In step 8050 (corresponding to step 6050), the data is copied into the secondary volume in the virtualized cache memory. Once the data is stored in the cache memory, step 8060 (corresponding to step 6060) sets the difference bit to "0". In the presence of the next bit in step 8070 (corresponding to step 6070), the process of steps 8020 to 8060 is repeated. In the absence of the next bit, the process is terminated. In this way, the virtualized secondary volume data is stored on the cache memory. The process up to this stage is similar to that in the case where both primary and secondary volumes are located in the same storage control unit.

On the other hand, the virtualized secondary volume data stored asynchronously on the cache memory is required to be stored in the actual secondary volume. For this purpose, a request to create a replication from the primary storage control unit 20A is transmitted to the secondary storage control unit 20B and a replication is created in the secondary storage control unit 20B. Specifically, a replication is created in a disk unit connected to the secondary storage control unit 20B in the following manner: The storage control unit 20A having a primary volume issues to the storage control unit 20B a request to write the data (dirty data) on the cache memory not reflected in the storage unit of the storage control unit 20B for producing a secondary volume (step 8110). The secondary storage control unit 20B secures a cache memory for storing the write data (step 8120). The primary storage control unit 20A is notified that the cache memory has been secured (step 8130). The primary storage control unit 20A, upon receipt of the notification, transfers the write data (step 8140). The primary storage control unit 20A receives a transfer completion notification from the secondary storage control unit 20B (step 8150). The primary storage control unit 20A, in the presence of the next dirty data, repeats the process of steps 8110 to 8150 (step 8160). In the absence of the next dirty data, on the other hand, the process is terminated. The secondary storage control unit 20B stores the data from the cache memory into the secondary volume asynchronously (step 8170).

The initial copy process is for copying the data corresponding to all the difference bits. Even after complete initial copy process, the difference bit map is set to "1" if a write request is received midway. In this residual copy process, the difference bit map is searched from the head sequentially, and upon detection of a bit "1", a similar copy process as the initial copy process is executed.

The normal read/write request may arrive during the initial copy process. The process to be executed when a write request arrives is explained below with reference to the flowchart of FIG. 9.

The storage control unit 20A receives a write request from the host 10 (step 9010). The storage control unit 20A sets to "1" the bit at a particular position of the difference bit map 240 P1 (FIGS. 2 and 11) corresponding to the data to be written (step 9020). The storage control unit 20A secures the cache memory area for storing the write data (step 9030). The storage control unit 20A receives the write data from the host 10 and stores it in the cache memory (step 9040). The storage control unit 20A returns a write completion notification to the host 10 (step 9050).

The storage control unit 20A stores the write data independence of the write request from the host in the primary volume asynchronously (step 9060).

The process of reflecting the contents of the write data in the secondary volume is executed in such a manner that the difference bit map is sequentially watched, and upon detection of a bit "1" (step 9070) with a pair in the same storage control unit (step 9080), the process of steps 6030 to 6060, 6080 is executed (step 9090), while the process of steps 8030 to 8060, 8110 to 8150, 8170 is executed for a pair between different storage control units (step 9100). In search of the next bit, the process proceeds to step 9070, and in the absence of the next bit, the process is terminated (step 9110).

Next, the split state of the pair is explained. Once a pair is split, the difference bit maps 240 P1 and 240 P2 are switched. As shown in FIG. 11, the difference bit maps P1 and P1 are held in the memory 22 for each pair in the memory 22 of the storage control unit of the primary volume. The difference bit maps P1 and P2 are assumed to have the same size. The difference bit maps used during the split state are held in the memory 22 of the storage control unit of the primary volume, and each time the secondary volume is updated, the difference bit maps in the storage control unit 20A are accessed.

For resynchronization with the contents of the primary volume, the prevailing contents of the primary volume are copied to the secondary volume. For this purpose, the two difference bit maps, primary and secondary, are merged and the same process is executed as the initial copy process. In other words, in the case where one of the bits for primary or secondary volume is set to "1", all the volumes are copied.

Figure 12:
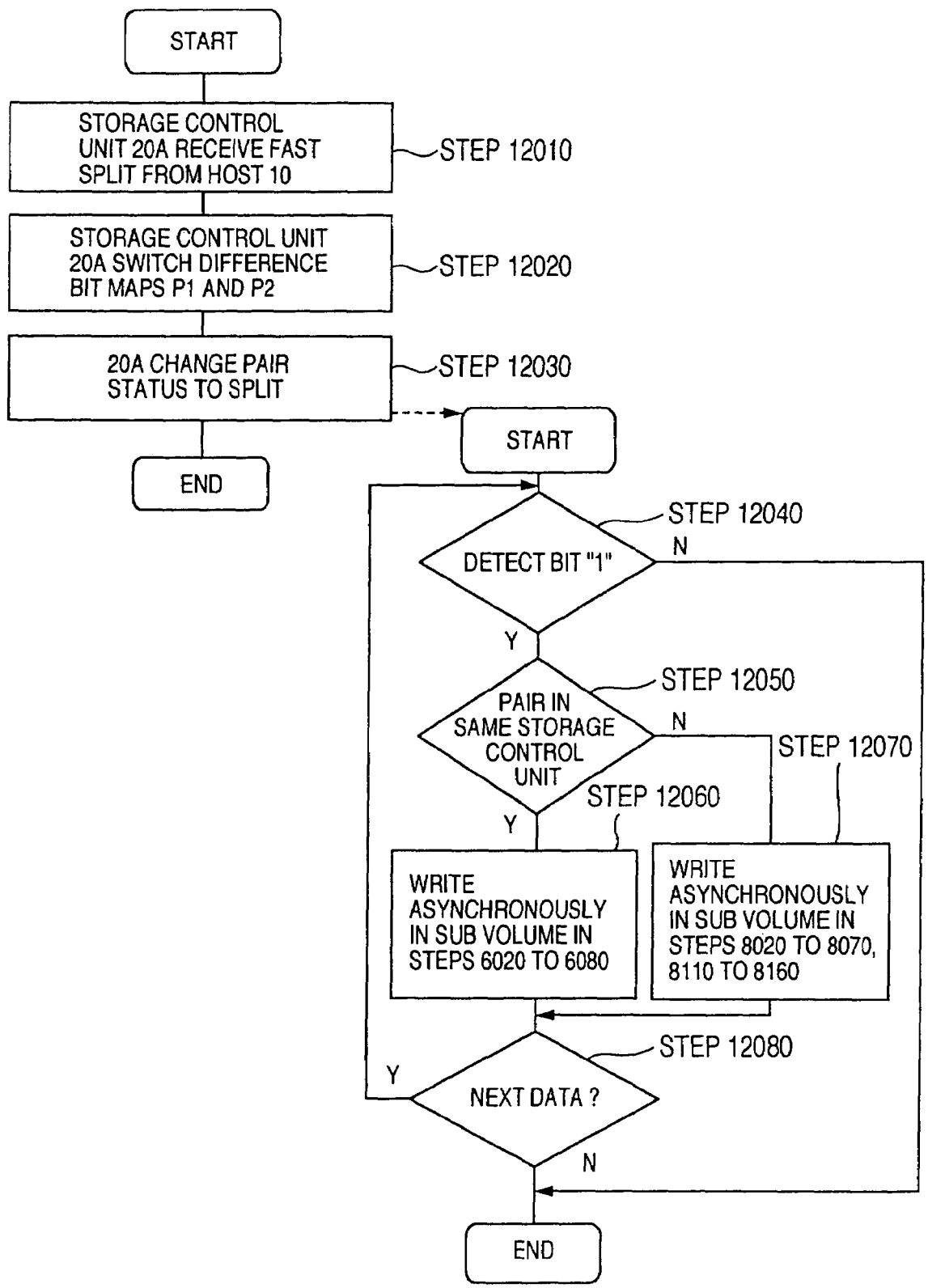
FIG. 12 is an example of a flowchart showing the split process.

The normal split process is executed at the time point when the contents of the primary and secondary volumes are synchronized with each other after initial copy process. Apart from this, the "fast split" process is executed in such a manner that upon receipt of a split request even during the initial copy process, a split completion is notified to the host 10 while the reprimarying copy process is executed in the background. FIG. 12 is a flowchart showing the split process according to this method. As shown in FIG. 12, the host 10 issues a "fast split" instruction, and the storage control unit 20A, upon receipt of the instruction (step 12010), switches the difference bit map 240 for storing the write request of the host 10 from P1 to P2 (step 12020). The storage control unit 20A changes the pair status 226 (FIG. 4) of the volume pair information table 220 to "split" (step 12030). Now, the primary and secondary volumes are ready to receive a read/write request. The storage control unit 20 executes the process of copying the unreflected data to the secondary volume in the background. The process of reflecting the data in the secondary volume is executed in such a manner that the difference bit map is sequentially watched, and upon detection of a bit "1" (step 12040) with a pair in the same storage control unit 20 (step 12050), the process similar to steps 6020 to 6080 is executed (step 12060). In the case where a pair between different storage control units 20 is involved, on the other hand, the process of steps 8020 to 8070 and steps 8110 to 8160 is executed (step 12070). In search of the next bit, the process proceeds to step 12040. In the absence of the next bit, the process is terminated (step 12080).

Figure 13:
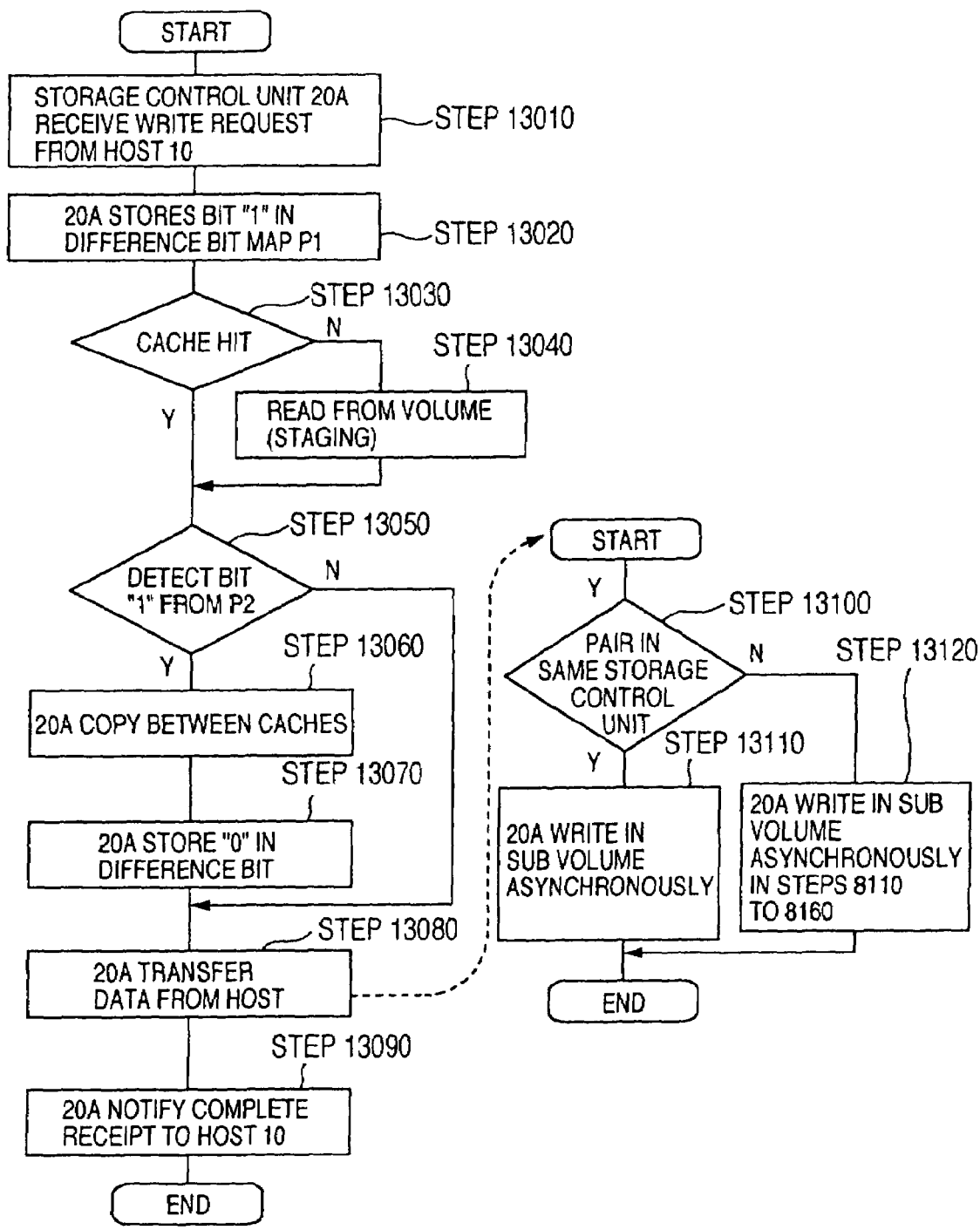
FIG. 13 is an example of a flowchart showing the process of receiving a write request to the primary volume and the process of receiving a write request to the secondary volume in fast split mode.

The process executed when a write request is received by the primary volume from the host 10 in fast split mode is shown in FIG. 13.

The storage control unit 20A receives a write request into the primary volume from the host 10 (step 13010). The storage control unit 20A sets the bit to "1" at a position corresponding to the write data in the difference bit map 240 P1 (FIG. 11) (step 13020). It is determined whether the data at the position corresponding to the particular bit is in the cache memory or not (step 13030). In the case where the data is not found in the cache memory in step 13030, the corresponding data is read into the cache memory from the primary volume (step 13040). Upon detection bit "1" at a position corresponding to the old write data of the difference bit map P2, the process proceeds to step 13060. Otherwise, the process proceeds to step 13080 (step 13050). In the case where a bit is set to "1", it indicates that the data corresponding to the particular bit has yet to be copied to the secondary volume. The old data is copied to the data area of the secondary volume in the cache memory (or the secondary volume area virtualized in the cache memory in the case of the pair between different storage control units) (13060). In the absence of the data in the cache memory, on the other hand, the data may be read twice for the primary and secondary volumes. With the copy operation, the redundant information for determining whether the data is correct or not is newly produced for the secondary volume and attached to the data. Once the data is stored in the cache memory, the difference bit is set to "0" (step 13070). As the result of executing the process of steps 13030 to 13070 described above, the old data of the primary volume is stored in the secondary volume data area in the cache memory (or the secondary volume data area virtualized in the cache memory in the case of a pair between different storage control units). After step 13070, or in the case where determination in step 13050 is NO, the data to be written to the bit involved is received from the host 10, and stored in the cache memory area for the primary volume (step 13080). A write completion notice is sent to the host 10 (step 13090).

In the case of a pair associated with the same storage control unit (step 13100), the data on the cache memory are stored in the secondary volume asynchronously (step 13110). In the case of a pair between different storage control units, on the other hand, in order to store the old data on the cache memory in the storage control unit 20B having a secondary volume having stored therein the actual data, the process of steps 8110 to 8160 is executed (step 13120).

Next, an explanation is given about a case in which the secondary volume receives a write request from the host 10 in fast split mode. Reference is had to the flowchart of FIG. 13.

Like in step 13010, the storage control unit 20A receives from the host 10 a write request to the virtualized secondary volume. Like in step 13020, the storage control unit 20A sets the bit to "1" at a point corresponding to the write data in the difference bit map 240 P1 (FIG. 11). Like in step 13030, it is determined whether the data at a point corresponding to the bit is a cache memory area for the primary volume. Like in step 13040, in the case where the data is not available in the cache memory in step 13030, the corresponding data is read from the primary volume into the cache memory. Like in step 13050, upon detection of a bit "1" at a point of the difference bit map 240 P2 corresponding to the old write data, the process proceeds to step 13060. Otherwise, the process proceeds to step 13080. Like in step 13060, the old data is copied to the data area of the secondary volume in the cache memory (or the secondary volume area virtualized in the cache memory in the case of a pair between different storage control units). In the absence of data in the cache memory, the data may be read twice for the primary and secondary volumes. In the case where the data is read from the cache memory, the old data may be read directly into the data area of the secondary volume in the cache memory (or the secondary volume area virtualized in the cache memory in the case of a pair between different storage control units). By doing so, only one read process is enough. With the copy operation, the redundant information to determine whether the data is correct or not is also newly produced for the secondary volume, and with the data, stored in the cache memory. In the case where the write data are coincident with all the data corresponding to the bits, the old data is not required to be stored in the cache memory, and therefore only the area is secured. Once the data is stored in the cache memory, the difference bit is set to "0" (like in step 13070). The data to be written to the bit involved is received, and stored in the cache memory area for the secondary volume (like in step 13080). A write completion notice is issued to the host 10 (like in step 13090). After that, the same process is executed as steps 13100 to 13120. The host issuing a write request to the secondary volume may be other than the host 10 issuing a write request to the primary volume.

Figure 15:
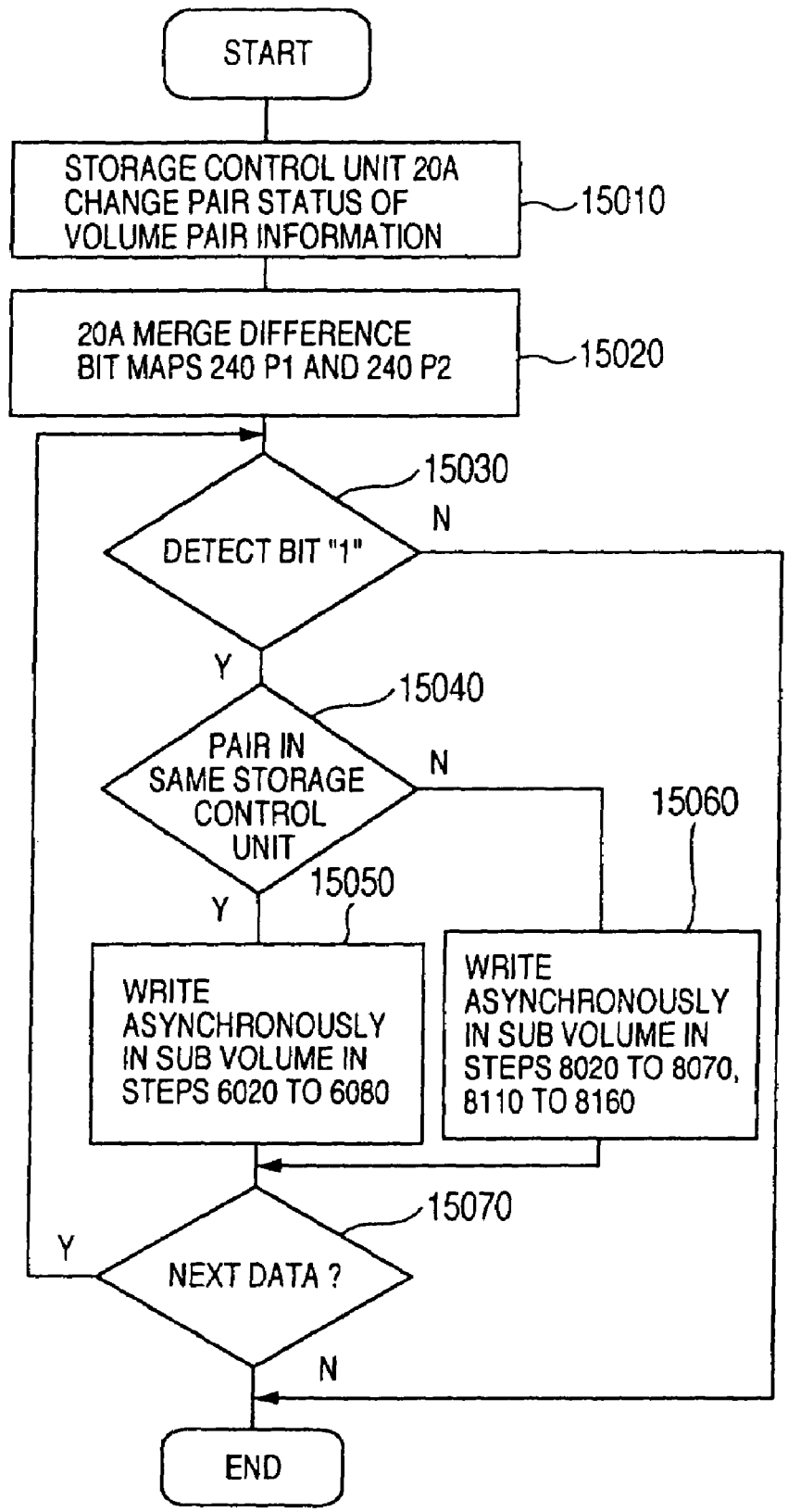
FIG. 15 is an example of a flowchart showing the resynchronization process.

Next, the resynchronization of the volumes is explained with reference to the flowchart of FIG. 15. The primary volume and the secondary volume that have entered the split state are processing read and write requests, respectively, and therefore have different contents. The resynchronization is defined by the process of setting the contents of the secondary volume to the contents of the primary volume at the particular time point. First, the pair status of the volume pair information is changed (step 15010). The difference bit maps 240 P1 and 240 P2 are merged with each other and stored in the difference bit map 240 P1 (step 15020). Upon detection of bit "1" in the difference bit map 240 P1 (step 15030), the process similar to the initial copy process is executed. Specifically, for a pair in the same storage control unit (step 15040), the process of steps 6020 to 6080 is executed (step 15050), while the process of steps 8020 to 8160 is executed for a pa between different storage control units (step 15060). In search of the next bit, the process proceeds to step 15030. Otherwise, the process is terminated (step 15070).

As explained above, in the case where the original volume and the replication volume are associated with different clusters, the pair may be rendered to appear to belong to the same cluster to the host by the virtualization technique in which the actual replication volume is virtually assigned to a vacant volume in the cluster of the original volume. As a result, a cluster configuration storage system is provided for producing a copy of the storage area freely without being conscious of the cluster.

The replication creation process is explained above. The processing speed priority process is explained below. In the processing speed priority process, the process of producing a replication volume and the normal read/write request (normal I/O) are processed in the order of priority according to the prevailing situation.

In the replication process described above, the process due to the copy process is transferred from the primary cluster to the secondary cluster regardless of the situation of the secondary cluster. Nevertheless, the secondary cluster receives the normal host I/O. Also, the secondary cluster has an copy function engine and produces a copy of the volume in the cluster. In this way, each cluster has the copy function and a job request queue, so that jobs are started and processed in accordance with the order of priority of the job types.

In the case where the replication process is executed over clusters and the communication is conducted over the clusters in the normal read/write request fashion, the party that has received the request cannot distinguish it from the normal I/O from the host. Nevertheless, the host I/O is desirably executed in priority over the process of the copy function.

Specifically, in the case of a pair between different storage control units, the storage control unit 20B having a secondary volume has no way of distinguishing the write request received from the primary storage control unit 20A from the normal write request received from the host 10. Thus, the storage control unit 20B processes all the write requests on first-come first-served basis. As a result, the response time of the normal write request is lengthened, and the performance sometimes appears to be deteriorated. These write requests are discriminated by the storage control unit 20B and a schedule is formed for the order in which they are executed, thereby realizing a high performance.

The embodiment described below refers to the processing speed priority process in which the original volume sets the job priority in the replication volume.

Assume that the write request received from the primary storage control unit 20A and the normal write request received from the host 10 are discriminated from each other by volume unit. In the case of a volume in the storage control unit 20B of which a replication is being created, the storage control unit 20A recognizes whether the particular volume is in paired state or not. The storage control unit 20A can thus determine, by the pair status, whether the request to the volume creating a replication in the storage control unit 20B is for the copy process to create a replication or for the normal read/write operation.

Figure 16:
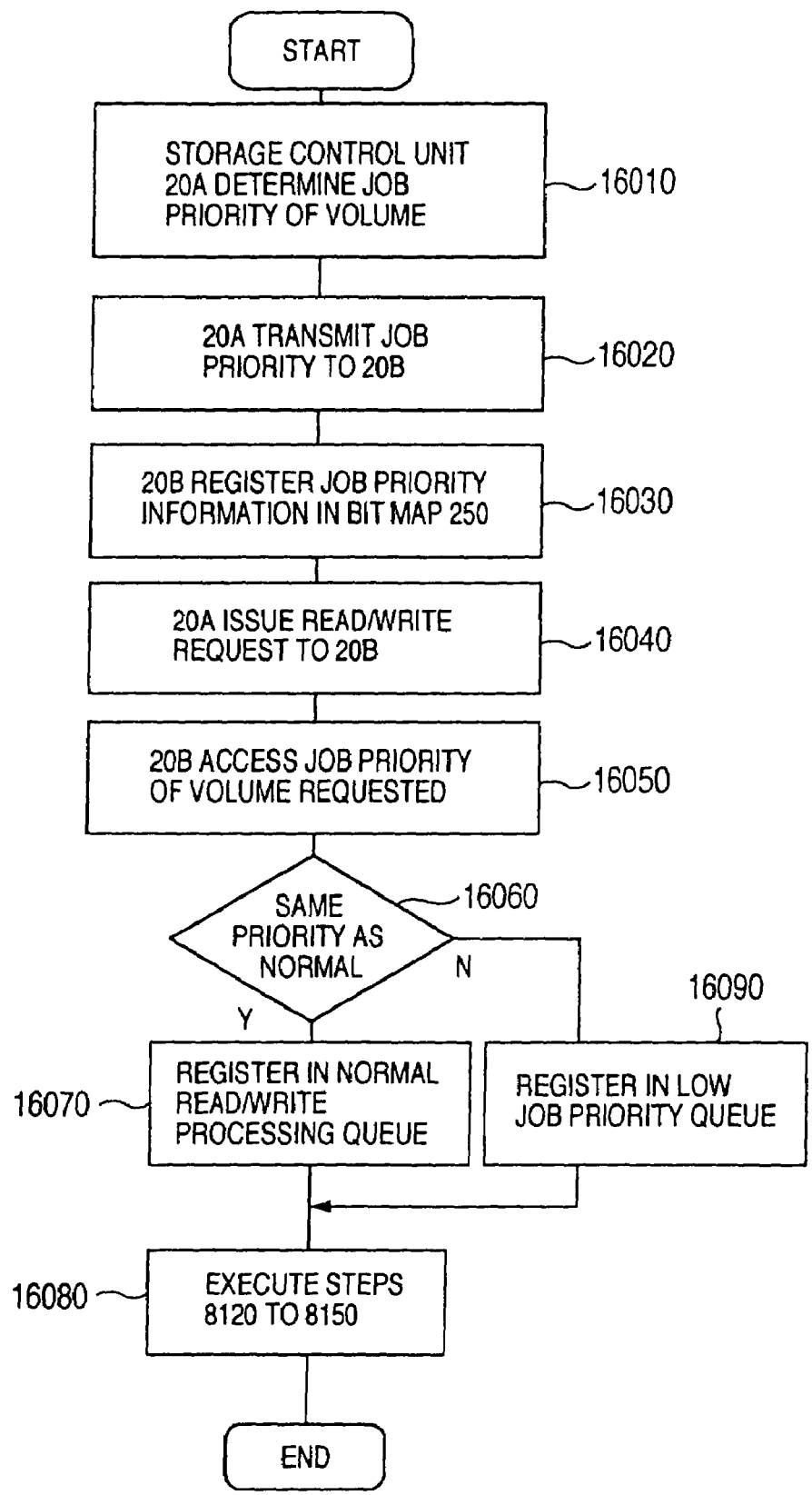
FIG. 16 is an example of a flowchart of the job priority information registration process and the read/write process based on the job priority information.

This is explained with reference to the flowchart of FIG. 16. According to the job priority set program 202 (FIG. 2) in the storage control unit 20A, the job priority is determined as to whether a request to the volume in the storage control unit 20B paired with the volume in the storage control unit 20A is to be processed in the same manner as the normal read/write request (step 16010). The job priority information determined in the storage control unit 20A is delivered to the storage control unit 20B (step 16020). The storage control unit 20B registers the job priority information at the bit position of the volume number in the job priority information bit map 250 (FIGS. 2 and 14) in the memory 22 (step 16030). The job priority information bit map 250 manages the information as to whether the data is to be processed according to a schedule for each volume number like the normal read/write request.

In the case where it is desired to execute the process rapidly and a schedule is formed without discrimination from the normal read/write request, the bit is set to "1", while the bit is set to "0" when the normal read/write request is desirably processed in priority. As an alternative, the job priority of the normal read/write request is set to 5, and the other requests may be managed in the order of priority of 4 to 1. In the process, several bits, but not one bit, are prepared for each volume.

During the creation of a replication, assume that a read/write request is issued in step 8110 by the storage control unit 20A to the storage control unit 20B (step 16040). The storage control unit 20B receives the request, and accesses the job priority information of the volume for the request (step 16050). As far as the job priority information is adapted to be scheduled like the normal read/write request (step 16060), it is placed in the normal read/write processing queue 261 (FIG. 2) (step 16070), and when the request is selected from the queue, the cache memory area is secured in step 8120 and the steps 8130 to 8150 are executed (step 16080). In the case where the job priority information is lower in priority than the normal read/write request in step 16060, the data is placed in another low job priority queue 262 (FIG. 2) than the normal read/write processing queue 261 (step 16090), and when the data is selected, the process of step 16080 is executed. The priority order of the job priority information of the volume may be input by a primarytenance worker from, for example, the user input/output apparatus 80 such as SVP (SerVice Processor).

The normal read/write processing queue 261 and the low job priority queue 262 are the control information having a queue structure managed in the order of the time of issuance in accordance with the arrangement or the list structure.

The real secondary volume 312 corresponding to the virtualized volume 313 (FIG. 7) is transparent to the host 10, and therefore no request is issued to the volume 312 from the host 10. The request to the volume 312 arrives only through the storage control unit 20A. Thus, the storage control unit 20A can determine whether the request of the volume 312 is to be processed immediately or not.

Figure 17:
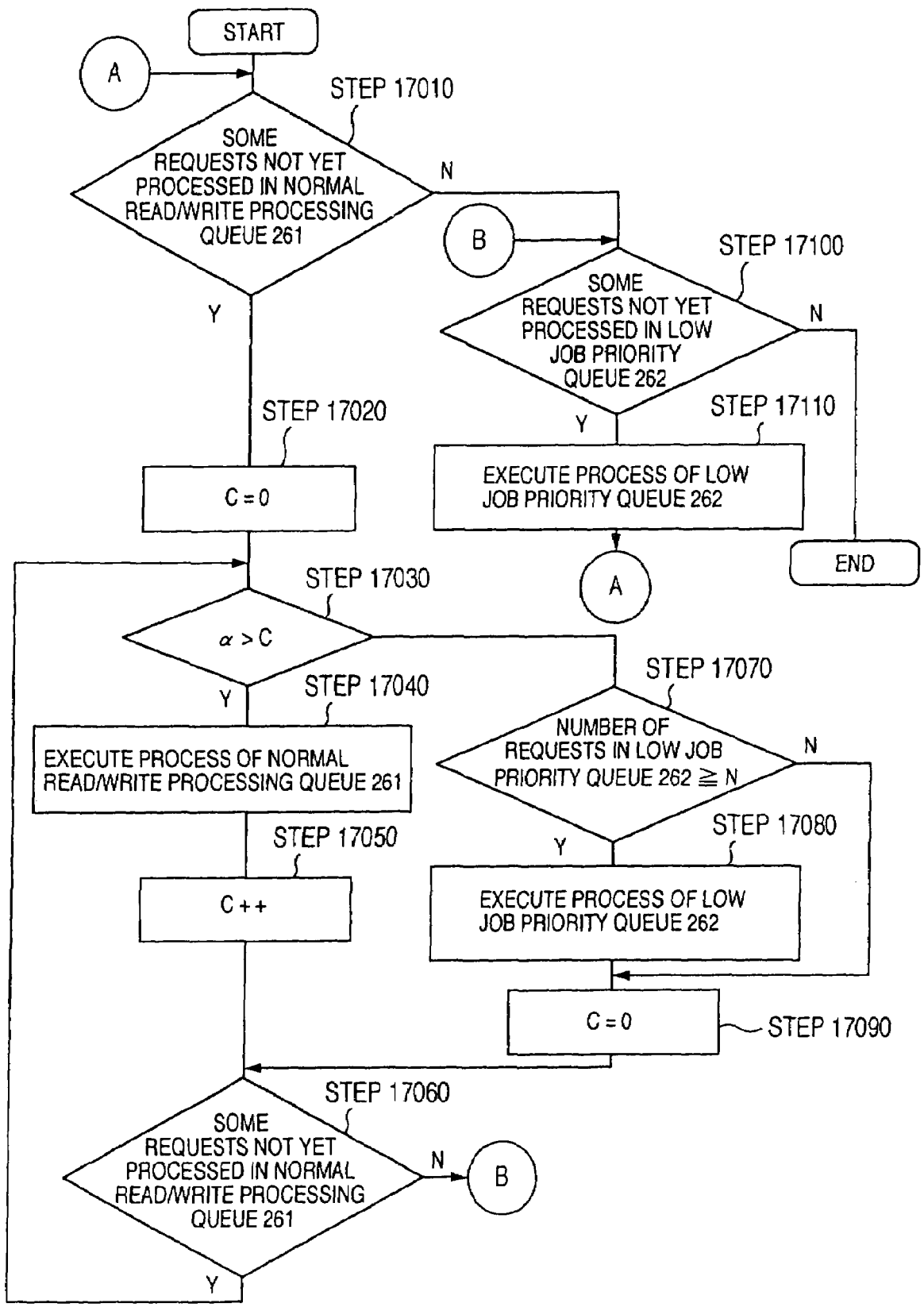
FIG. 17 is an example of a schedule-type flowchart of a low job priority queue.

The scheduling for the low job priority queue 26 is explained with reference to the flowchart of FIG. 17. The low job priority queue 262 is lower in processing frequency than the normal read/write processing queue 261. The processing frequency $\alpha$ is changeable by the setting operation of the user.

Assume that the processing frequency is $\alpha$. It is determined whether the normal read/write queue 261 has an unprocessed request or not (step 17010). If there is any unprocessed request, the counter c is set to 0 (step 17020). In the case where $\alpha>c$ (step 17030), the process of the normal read/write processing queue 261 is executed (step 17040), and the counter c is incremented (step 17050). It is determined whether the normal read/write processing queue 261 has a request yet to be processed (step 17060). In the presence of such a request, the process proceeds to step 17030. In the absence of such a request, on the other hand, the process proceeds to step 17100. Once the relation $\alpha \leq c$ is achieved in step 17030, it is determined whether the number of unprocessed requests of the low job priority queue 262 is not smaller than n, or whether the old unprocessed request of the low job priority queue 262 has passed the time m (step 17070), where m and n are predetermined numerical values. Once the condition of step 17070 is met, the process of the low job priority queue 262 is executed (step 17080). The counter c is set to 0, and the process proceeds to step 17060 (step 17090). Unless the condition is met in step 17070, on the other hand, the process proceeds to step 17090.

In the case where it is determined in step 17010 that there is no request yet to be processed, the process of the low job priority queue 262 is executed, and the process proceeds to step 17010 (step 17110).

In the case where a read/write request is issued from the storage control unit 20A to the storage control unit 20B in step 16020, the storage control unit 20A issues the request without being conscious of the state of the storage control unit 20B. The amount of the dirty data in the cache memory of the storage control unit 20B may be increased by the normal read/write process or the replication process in the storage control unit 20B. The increase in the dirty data amount beyond a predetermined reference value indicates a smaller available capacity of the cache memory. By suspending the replication process or executing the process to secure the data from the cache memory to the disk unit in priority, therefore, the vacant area of the cache memory is required to be increased. The storage control unit 20B accesses the job priority order of the volume for the request in step 16050, while at the same time accessing the dirty data amount. In the case where the dirty data amount is increased beyond a predetermined (preset) reference value, the process of steps 8120 to 8150 for securing the cache memory area and delaying the process of receiving the data is executed thereby to adjust the amount of the requests to be received from the storage control unit 20A. The storage control unit 20A stops issuing a request before receiving a completion notice from the storage control unit 20B.

Next, a modification of the processing speed priority process is explained for supplying information from the primary cluster to the secondary cluster as to whether the replication volume is processed without affecting the normal read/write request (normal I/O) or equivalently to the normal read/write request (normal I/O). Unlike in the embodiment described above, the modification described below represents a case of the processing speed priority process in which the replication volume determines whether a process is to be executed in priority or nonpriority.

In the case where the request transmitted from the primary cluster to the secondary cluster is a copy processing request (request to create a replication), the primary cluster (original volume) transmits the request to the secondary cluster together with a request type indicating that the particular request is a copy processing request (request to create a replication). The secondary cluster (replication volume) that has received the request recognizes that the request with the request type attached thereto is low in priority, and places the request in the low job priority queue 262 (FIG. 2). In this way, the secondary cluster can determine the job priority based on the request type received from the primary cluster. In the case under consideration, the primary cluster transmits a request to create a replication with the information indicating that the particular request is to create a replication. Nevertheless, it is always the secondary cluster that determines whether the request is low in priority or not. Thus, the secondary cluster can determine whether the request to create a replication is to be processed as a low priority.

In another method, the primary cluster (original volume) adds to the instruction general information indicating whether a request be given priority or not or the priority n of the request, but not a specific request type indicating a copy request. Upon receipt of this instruction, the secondary cluster (replication volume) recognizes the priority information thus added and forms a schedule of the processing order taking the particular priority into consideration. As a result, the secondary cluster can determine the job priority based on the priority order n or the priority/non-priority information of the request received from the primary cluster. Also in this case, it is the secondary cluster that determines whether a request to create a replication is to be processed as a low priority. In this case, however, the determination of the secondary cluster is based on the priority order n or the ordinary priority/non-priority information included in the request. Thus, the secondary cluster can determine whether a request to create a replication is to be processed in priority by the normal request processing.

The primary cluster gives the secondary cluster information as to whether the replication volume is processed without affecting the normal I/O or equivalently to the normal I/O. In the former case, the secondary cluster, by reference to this information. In the latter case, on the other hand, a schedule is formed to process the requests in chronological order.

The processing speed priority process described above makes possible a replication without interfering with the normal business I/O.

Figure 18:
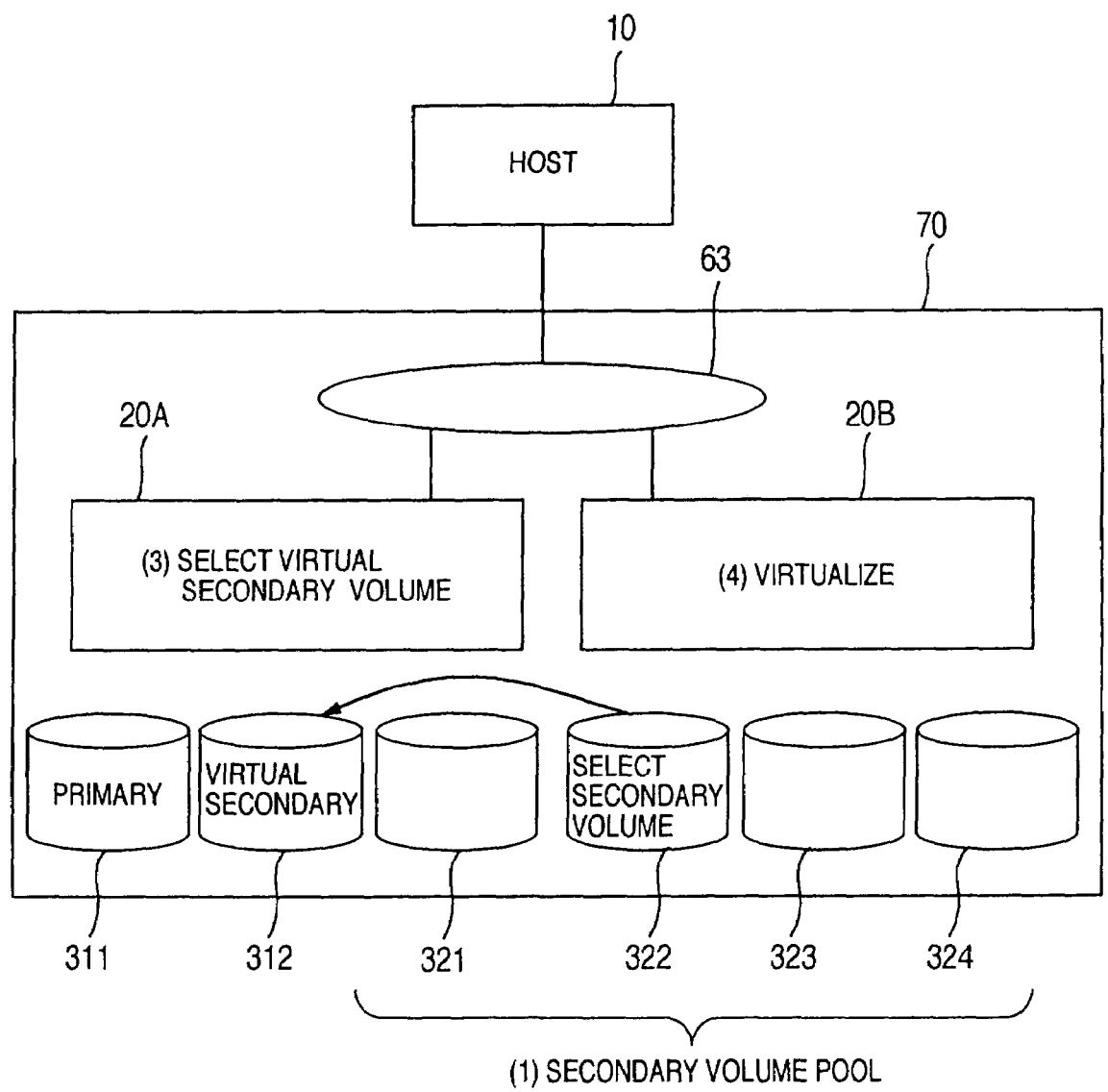
FIG. 18 is a diagram for explaining the user operation for realizing a pair between clusters as a pair in the same cluster.

A cluster configuration storage system according to an embodiment of the invention was explained above. With reference to FIG. 18, an explanation is given about the user operation for realizing a pair in the same cluster from a pair between different clusters by the virtualization technique of the cluster configuration storage system described above.

First, the user selects a replication volume. Vacant volumes 321, 322, 323, 324 constituting candidates for a replication volume against the original volume 311 are presented as a secondary volume pool to the user. The secondary volume pool includes a volume of a cluster different from the original volume.

The user selects a secondary volume by inputting the vacant volume 322, for example, from the user input/output apparatus 80. In the case shown in FIG. 18, the selected volume 322 is associated with a cluster (storage control unit 20B) different from the cluster (storage control unit 20A) of the original volume 311.

The replication volume is associated with a different cluster, and therefore a secondary volume to be virtualized is selected from the vacant volumes of the original cluster. In the case under consideration, the volume 312 is selected as a virtual secondary volume. This volume is not a real volume, and therefore requires no physical resource such as HDD. Device numbers exclusively used for virtualization may be prepared and an appropriate one of them may be selected.

In this case, the secondary volume candidate is existent in the same cluster as the original volume, and therefore the particular volume may be presented from the system to the user so that the user may be allowed to select the same volume from among the candidates. As another alternative, the user is presented with volume candidates and a volume is selected from the secondary volume pool and/or from virtualized volumes, by input from the user input/output apparatus 80, or a host command is used or a candidate is automatically selected on the part of a storage control unit.

The replication creation program 201 (FIG. 2), as described above, registers the information in the volume pair information table 220 based on the information from the user input/output apparatus or the host command from the host. As another alternative, the replication creation program 201 registers the information automatically in the volume pair information table 220.

The invention developed by the present inventor has been specifically described above with reference to embodiments. This invention, however, is not limited to the embodiments described above, but variously modifiable without departing from the spirit and scope of the invention.

What is claimed is:

1. A storage system coupled to a host computer comprising:
   a plurality of control units each connected with a respective disk unit and controlled to read/write data sent from the host computer from/to the respective disk unit,
   wherein the plurality of control units form a pair relationship between a first volume and a second volume in the storage system, the plurality of control units control to copy between the first volume and the second volume, and the second volume is a virtual volume related to a logical volume, and
   a replication creation unit being adapted to create a copy of the data of a logical volume relating to the disk unit connected with the corresponding control unit;
   wherein the replication creation unit of a first control unit operates in such a manner that
   in the case where a copy of a first volume, relating to the disk unit connected to a first control unit, is created in the logical volume relating to the disk unit connected to the first control unit, the volume information of the first volume and the volume information of the copy volume are formed in the pair relationship, and the copy is created in the logical volume relating to the disk unit connected to the first control unit based on the pair relationship, and
   in the case where a copy of a first volume, relating to the disk unit connected to the first control unit, is created in a logical volume relating to the disk unit connected to a second control unit, the volume information of the first volume, virtual volume information of a virtual replication volume virtualized in the disk unit connected to the first control unit, and information on a second control unit are registered in the pair relationship, and a request to create a copy is transmitted to the second control unit based on the pair relationship when a copy request is sent from the host computer for creating the copy volume in the disk unit connected to the first control unit; and
   wherein in the case where a copy is created in the volume relating to the disk unit connected to the second control unit, the replication creation unit of the first control unit issues to the second control unit a request to write the data corresponding to the virtual replication volume to the logical volume of the second control unit corresponding to the virtual replication volume.

2. A method of creating a copy in a storage system coupled to a host computer, the storage system including a plurality of control units each connected with a respective disk unit and controlled to read/write data sent from the host computer from/to the respective disk unit, comprising the steps of:
   forming a pair relationship between a first volume and a second volume in the storage system,
   controlling to copy between the first volume and the second volume,
   wherein the second volume is a virtual volume related to a logical volume,
   wherein the forming and controlling steps are performed by the plurality of control units; and
   wherein, in the case where a replication is created in the logical volume relating to the disk unit connected to the second control unit, a replication data of an original logical volume is transferred from the first control unit to the logical volume of the second logical unit based on the pair information,
   registering in a first control unit first volume information and second volume information as the pair relationship, in the case where a copy of the data of the first volume in a logical volume relating to the disk unit connected to the first control unit is created in the logical volume relating to the disk unit connected to the first control unit;
   registering in the first control unit the first volume information, virtual volume information of a virtual replication volume virtualized in the disk unit connected to the first control unit, and information on a second control unit in the pair relationship of the first control unit, in the case where a copy of the data of an original volume, relating to the disk unit connected to the first control unit, is created in a logical volume relating to the disk unit connected to the second control unit, wherein the virtual volume information of the virtual replication volume includes a volume number of a volume virtualized in the disk unit connected to the first control unit but for which no volume is created in the disk unit connected to the first control unit;

generating in the first control unit a copy of the first volume relating to the disk unit connected to the first control unit, based on the pair relationship, in the case where a copy of the data of the first volume relating to the disk unit connected to the first control unit is created in the logical volume relating to the disk unit connected to the first control unit; and sending from the first control unit a copy creation request to the second control unit based on the pair relationship when a copy request is sent from the host computer for creating the copy volume in the disk unit connected to the first control unit, in the case where a copy of the data of the first volume in the logical volume relating to the disk unit connected to the first control unit is created in the logical volume relating to the disk unit connected to the second control unit, wherein the host computer recognizes the replication volume created in the logical volume relating to the disk unit connected to the second control unit as having been created in the logical volume relating to the disk unit connected to the first control unit;

wherein the step of sending a copy creation request from the first control unit to the second control unit includes sending a request to write data from the virtual replication volume in the first control unit to a logical volume corresponding thereto in the second control unit.

* * * * *